United States Patent [19]

Holopainen

[11] Patent Number: 4,682,659
[45] Date of Patent: Jul. 28, 1987

[54] GROUND PIERCING ATTACHMENT FOR TRACTORS

[76] Inventor: Weikko R. Holopainen, R.F.D. #1, Box 69A, Mohawk Trail, Shelburne, Mass. 01370

[21] Appl. No.: 857,073

[22] Filed: Apr. 29, 1986

Related U.S. Application Data

[63] Continuation-in-part of Ser. No. 614,471, May 25, 1984, abandoned.

[51] Int. Cl.⁴ .............................................. E21B 7/26
[52] U.S. Cl. ...................................... 175/19; 173/27; 173/38
[58] Field of Search ............... 175/19, 135, 162, 203, 175/219; 173/38, 39, 45, 27; 172/247; 37/117.5, DIG. 3, DIG. 12; 24/241 P

[56] References Cited

U.S. PATENT DOCUMENTS

| | | | |
|---|---|---|---|
| 2,426,532 | 8/1947 | Tierney | 24/241 P X |
| 2,969,966 | 1/1961 | Matheis | 37/117.5 X |
| 3,327,789 | 6/1967 | Furuseth | 173/38 |
| 3,864,793 | 2/1975 | Guest | 37/DIG. 3 X |
| 4,066,134 | 1/1978 | Karns, III | 173/38 X |
| 4,087,010 | 5/1978 | Stormon | 37/117.5 X |

Primary Examiner—James A. Leppink
Assistant Examiner—Matthew Smith
Attorney, Agent, or Firm—Blodgett & Blodgett

[57] ABSTRACT

Ground piercing attachment for a tractor comprising a bracket which is adapted to be mounted to the lower end of the bucket of a tractor, an elongated bar and connector means for mounting the bar on the bracket so that the longitudinal axis of the bar assumes a vertical position irrespective of the orientation of the tractor so that raising of the bucket enables the bottom end of the bar to be positioned above the ground and subsequent lowering of the bucket causes the bar to be driven into the ground.

9 Claims, 13 Drawing Figures

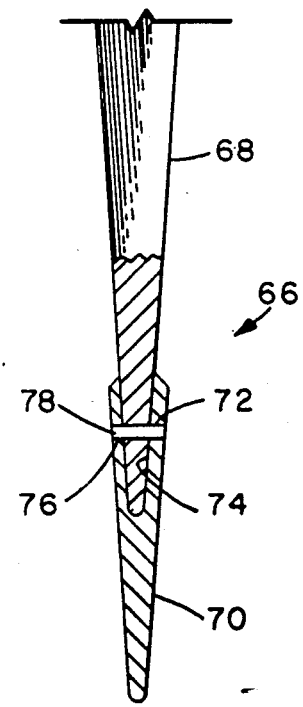
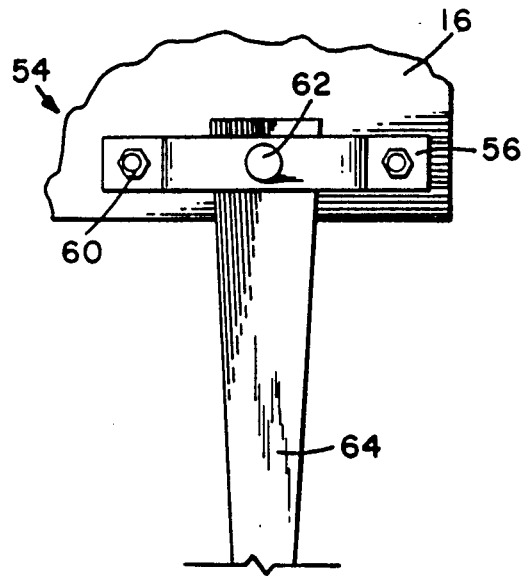
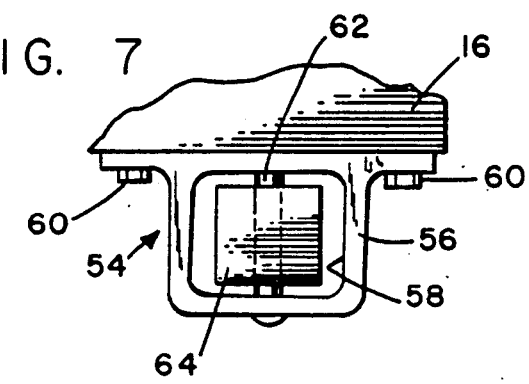
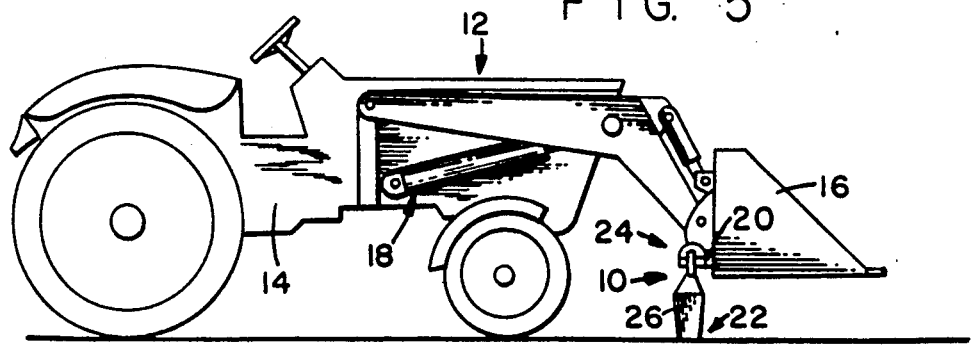

GROUND PIERCING ATTACHMENT FOR TRACTORS

This application is a continuation-in-part of prior U.S. application Ser. No. 614,471, filed May 25, 1984, now abandoned.

BACKGROUND OF THE INVENTION

The present invention relates generally to an attachment for a tractor and specifically for an attachment to the material handling bucket or scoop of a tractor for the purpose of forming a hole in the ground which is suitable for receiving a post.

Traditionally, postholes for fence posts or the like have been formed by hand with the use of a scissors-like posthole digger or by scooping out a hole by the bucket or scoop of a tractor.

Hand operated posthole diggers are capable of forming a hole in the ground which is approximately the size of the post which is to be inserted. The hole which is formed by a posthole digger would be impossible to duplicate with the use of a shovel. However, the use of a posthole digger is hard work and very time consuming. Also, some filling of dirt and tamping of the dirt around the post after the post has been inserted is usually still required.

The use of a power bucket or scoop such as that which is commonly mounted on tractors for digging postholes is far less tiring to the operator than a posthole digger and is less time consuming. However, the posthole which is formed, has a much larger diameter than the post so that after the post has been inserted into the hole, the rest of the hole has to be filled in with dirt. The bucket or scoop of the tractor can be utilized for filling in much of the hole with dirt. However, some hand shoveling and tamping of the dirt is still required to complete the job. These and other difficulties experienced with the prior art devices for forming postholes have been obviated by the present invention.

It is, therefore, an outstanding object of the invention to provide an attachment for a tractor for utilizing the power of the tractor to form a posthole which eliminates digging and subsequent filling in of the hole.

Another object of the invention is the provision of an attachment for a tractor which is removably attachable to the bucket or scoop of the tractor.

A further object of the present invention is the provision of an attachment for a tractor which utilizes the power of the tractor for forming a posthole by piercing the ground.

It is another object of the instant invention to provide an attachment for a tractor which forms a hole by piercing the ground and is vertically self-aligning.

A still further object of the invention is the provision of a tool attachment for a tractor which forms a posthole by piercing the ground and includes a replaceable hardened point at the end of the tool which is utilized to penetrate the ground.

With these and other objects in view, as will be apparent to those skilled in the art, the invention resides in the combination of parts set forth in the specification and covered by the claims appended hereto.

SUMMARY OF THE INVENTION

In general, the invention consists of a ground piercing attachment for a tractor which comprises a bracket for mounting the attachment to the bucket or scoop of a tractor, an elongated bar and a connector for mounting the bar on the bracket so that the longitudinal axis of the bar automatically assumes a vertical position irrespective of the orientation of the tractor. The bar is driven into the ground to form a posthole by lowering the bucket or the scoop of the tractor. More specifically, the bar is tapered and the connector is a universal connector which enables the bar to be freely suspended from the connector so that the longitudinal axis of the bar automatically assumes a vertical position.

BRIEF DESCRIPTION OF THE DRAWINGS

The character of the invention, however, may be best understood by reference to one of its structural forms, as illustrated by the accompanying drawings, in which:

FIG. 5 is a view similar to FIG. 1 but with the attachment of the present invention shown in a ground piercing position, FIG. 6 is a rear elevational view of a first modification, FIG. 7 is a plan view of the modification shown in FIG. 6, FIG. 8 is a fragmentary view of a second modification, with portions in sections.

DESCRIPTION OF THE PREFERRED EMBODIMENT

Figure 1:
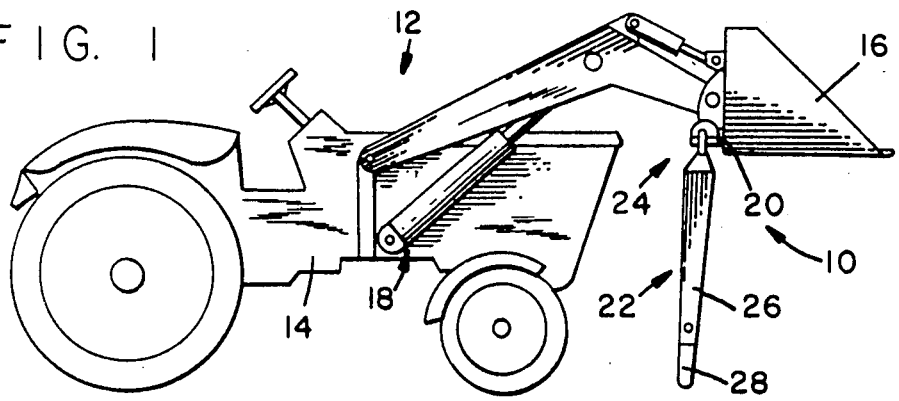
FIG. 1 is a side elevational view of a ground piercing attachment embodying the principles of the present invention, shown mounted on a conventional tractor.
Figure 3:
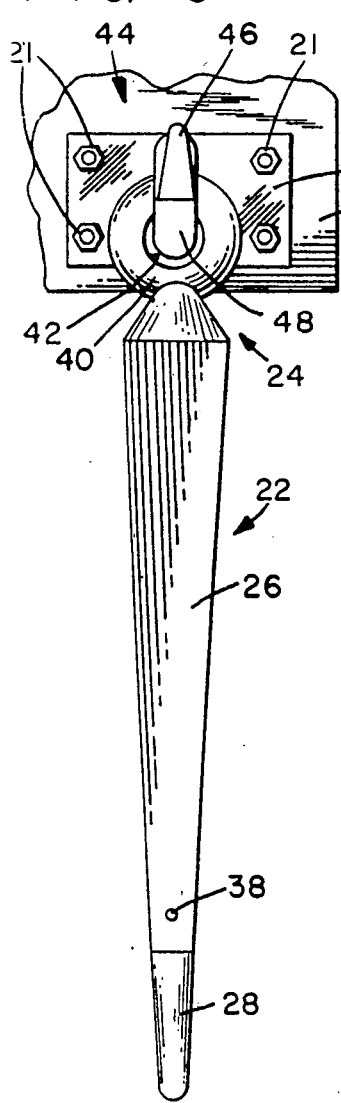
FIG. 3 is a rear elevational view of the ground piercing attachment.

Referring first to FIGS. 1–4, the ground piercing attachment of the present invention is generally indicated by the reference numeral 10 and is shown attached to the bucket 16 of a tractor, generally indicated by the reference numeral 12. The tractor 12 is a motor driven vehicle 14 which is provided with material handling apparatus, such as the bucket 16 and hydraulic drive means for the bucket which is generally indicated by the reference numeral 18. The tractor 12, which is illustrated in FIG. 1, is a garden tractor having a front end bucket. The term "tractor" is used in this application as meaning any farming or construction-type vehicle which is provided with material handling apparatus, such as a farm tractor, front end loader, back hoe, etc.

The ground piercing attachment 10 comprises a bracket 20 which is attached to the bucket 16 by means of bolts 21, an elongated tapered bar generally indicated by the reference numeral 22, and connector means generally indicated by the reference numeral 24.

The tapered bar 22 comprises an upper portion 26 and a lower portion 28 which is replacably attached to the upper portion 26. The upper portion 26 is preferably square in cross section and the lower portion 28 is preferably round in cross section and made of a material which is considerably harder than the upper portion 26. The lower end of the upper portion 26 is provided with a vertical bore 30 and a horizontal aperture 32 which intersects the bore 30. The lower portion 28 has an upper vertical projection 34 which is adapted to fit into the bore 30 and a hole 36 which is adapted to be aligned with the aperture 32 for receiving a retaining pin 38. In this way, a damaged or worn lower portion 28 may be replaced easily with an identical or a similar portion.

Figure 2:
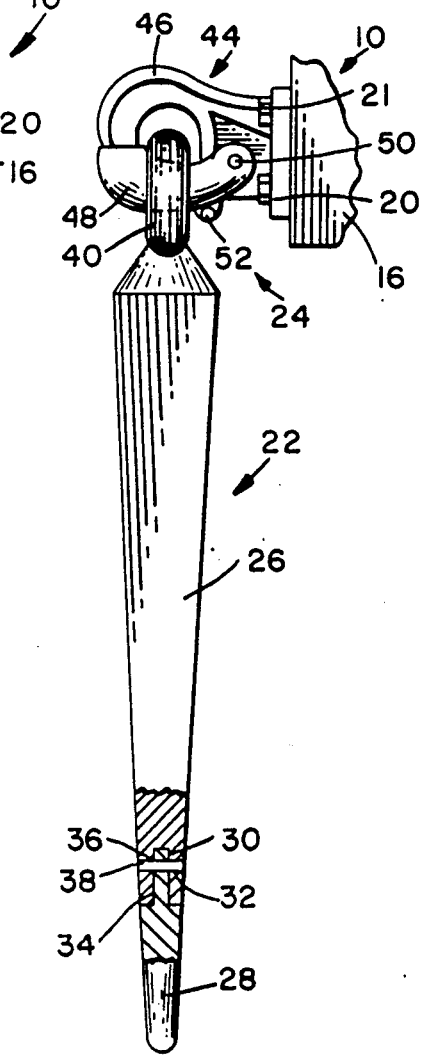
FIG. 2 is an enlarged side elevational view of the ground piercing attachment of the present invention shown in FIG. 1.
Figure 4:
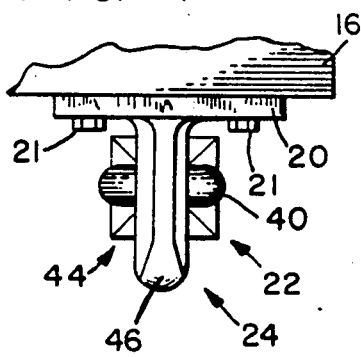
FIG. 4 is a plan view of the ground piercing attachment.

The connector means 24 comprises a ring 40 which is fixed to the top of the bar 22 and contains a central horizontal aperture 42. The ring 40 is adapted to be removably attached to a connector which is generally indicated by the reference numeral 44. The connector 44 is a type of trailer hitch which is commonly used on military vehicles and comprises a hook-shaped fixed portion 46 which extends from the bracket 20 and a movable arm portion 48 which is pivotally mounted on the fixed portion 46 by means of a pivot pin 50. The connector 44 is maintained in the closed position, as shown in FIG. 2, a locking mechanism, not shown. This locking mechanism is released by a release mechanism 52. The connector or trailer hitch 44 is normally applied to vehicles so that the fixed portion 46 is on the bottom and removable portion or arm 48 is on the top. However, for the present invention, the positions of the portions 46 and 48 are reversed as shown in the drawings.

The operation and advantages of the present invention will now be readily understood in view of the above description. During normal use of the tractor, the connector 44 remains on the bucket 16 without the bar 22. However, when the tractor has to be used for digging postholes, the connector 44 is opened by unlocking the movable arm 48 so that it can be pivoted relative to the fixed arm 46. The movable arm 48 is inserted through the central aperture 42 of the ring 40 and then swung back to the closed position, as shown in FIG. 2. The removable arm 48 extends through the aperture 42 with sufficient clearance so that the tapered bar 22 is suspended freely like a plumb. The central longitudinal axis of the bar always assumes a vertical orientation regardless of the position of the tractor 12 or the bucket 16.

At the beginning of a posthole forming operation, the tractor is moved into position and the bucket 16 is raised so that the bar 22 hangs freely over the spot where the posthole is to be formed, as shown in FIG. 1. The hydraulic mechanism 18 for operating the bucket 16 is actuated so that the bucket 16 is lowered thereby driving the bar 22 into the ground, as shown in FIG. 5. As the bottom point of the bar 22 strikes the ground, the top of the ring 40 bottoms out against the fixed arm 46 and the downward force which is applied to the bucket 16 is transmitted to the bar through the fixed arm 46. Under normal circumstances, sufficient forces transmitted to the bar 22 so that it can pierce the ground very easily. Even if the bottom of the bar strikes a stone, the stone can be displaced within the ground by wriggling or "working" the bar under power through the hydraulic drive mechanism 18. It is the same type of "working" practice commonly which is used by tractor operators to "work" the bucket or scoop working around stones during a digging operation. After the ground has been pierced by the bar 22, the hydraulic drive mechanism 18 is operated to raise the bucket 16 and remove the bar 22 from the ground, thereby leaving a hole in the ground which is suitable for a post. The post is then inserted into the posthole and the bucket 16 is positioned above the post and used as a pile driver to drive the post into the hole. The lower portion 28 of the bar is preferably rounded and formed of a hardened steel to facilitate the initial piercing of the ground. The upper portion 26 of the bar is preferably square in cross section so that a square posthole is formed. Since almost all posts are circular in cross section, the tapered and square cross section of the hole will ensure a tight planting of the post into the hole. The entire post planting operation is accomplished with the power of the tractor, including the initial forming of the hole and driving in of the post. The only manual operation involved is the operation of the tractor and positioning the post over the hole prior to driving the post into the hole. Also, no filling in and tamping of dirt is required during the entire operation.

FIRST MODIFICATION

Referring to FIGS. 6 and 7, there is shown a first modified ground piercing attachment generally indicated by the reference numeral 54. Attachment 54 comprises a bracket 56 mounted to the bucket 16 by means of bolts 60. Bracket 56 has a central vertical opening 58 and a horizontal pin 62 which spans the opening 58 from front to back. The central longitudinal axis of the pin is parallel with the longitudinal axis of the tractor. A bar 64 is pivotally mounted on the pin 62 so that it is free to swing in a vertical plane which is transverse to the longitudinal axis of the tractor. The longitudinal axis of the pin 62 is maintained in a horizontal position by actuation of the hydraulic drive means 18 of the tractor so that the bar 64 always assumes a vertical orientation, regardless of the orientation of the tractor. The bar 64 is identical to the bar 22 except for the top portion of the bar which is mounted on the pin 62. The modified ground piercing attachment 54 is utilized for forming a posthole in the same manner as the ground piercing attachment 10 of the preferred embodiment.

SECOND MODIFICATION

Referring to FIG. 8, there is shown a modified bar generally indicated by the reference numeral 66 which comprises an upper portion 68 and a replaceable lower portion 70. The lower end of the upper portion 68 has a horizontal hole 72. The lower portion 70 has a vertical bore 74 which opens at the top of the lower portion 70 and a horizontal aperture 76 which intersects the bore 74. The bore 74 is adapted to receive the lower end of the upper portion 68 so that the hole 72 is aligned with the aperture 76 for receiving a retaining pin 78. The top of the upper portion 68 can be identical to the bar 22 or the bar 64. Preferably, the lower portion 70 is circular in cross section and the upper portion 68 is square in cross section. It is also preferred that the lower portion 70 be made of hardened steel. When the lower portion 70 becomes damaged or worn, it is removed from the upper portion 68 by driving the pin 78 horizontally so that it is free of the lower portion 70. A new lower portion 70 is then inserted over the lower end of the upper portion 68 so that the hole 72 and the aperture 76 are aligned and the pin 78 reinserted so that it locks the lower portion 70 to the upper portion 68.

THIRD MODIFICATION

Figure 10:
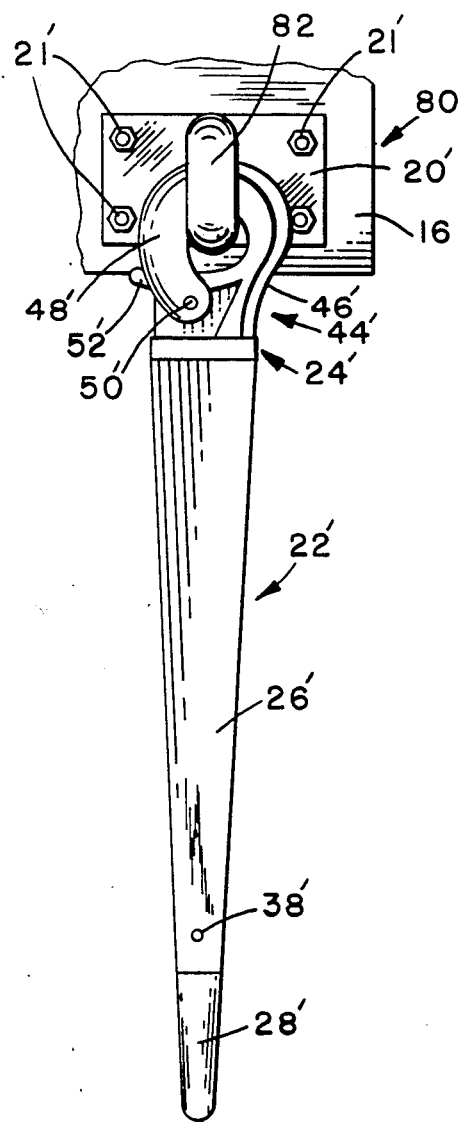
FIGS. 9–11 are similar to FIGS. 2–4 respectively, and showing a third modification.
Figure 9:
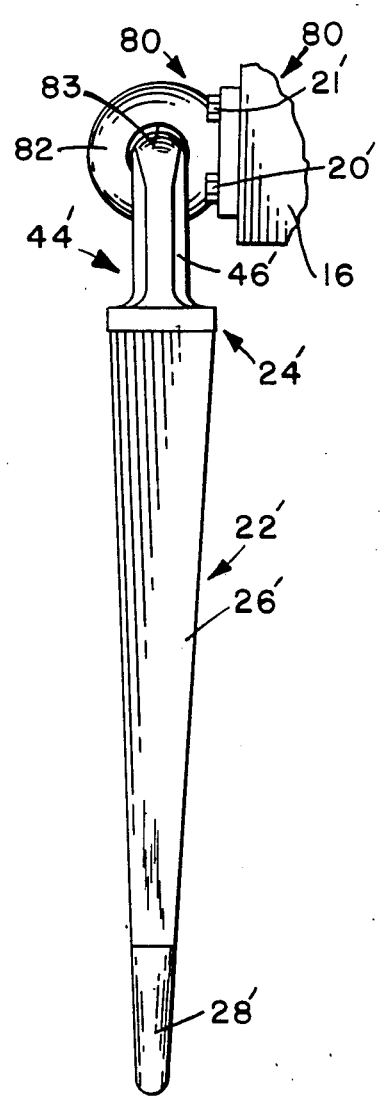
Figure 11:
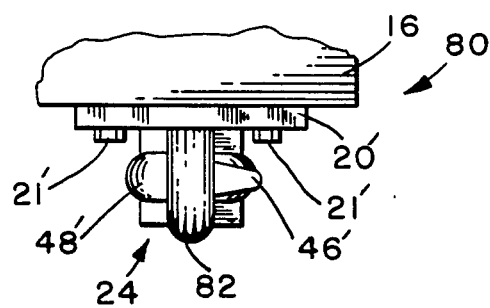

Referring to FIGS. 9-11, there is shown a third modified ground piercing attachment which is generally indicated by the reference numeral 80. The ground piercing atachment 80 includes an elongated tapered bar which is generally indicated by the reference numeral 22', and connector means generally indicated by the reference numeral 24'.

The tapered bar 22' comprises an upper body portion 26' and a lower body portion 28' which is replacably attached to the upper portion 26' and is held in position by a retaining pin 38' in the same manner as the bar 22 of the preferred embodiment. The elements 26' and 28' of the third modification 80 are identical to the elements 26 and 28, respectively, of the preferred embodiment.

The connector means 24' comprises an openable hitch or connector which is generally indicated by the reference numeral 44'. The connector 44' is identical to the connector 44 of the preferred embodiment except that it is welded or otherwise attached at the top of the bar 26' as shown in FIGS. 9-11. The connector 44' includes elements 46', 48', 52', and 50' which are identical to and function in the same manner as the corresponding numerals of the connector 44 of the preferred embodiment.

The connector means 24' also includes a ring 82 which is fixed to the bracket 20' and includes a horizontal aperture 83. The axis of the aperture 83 is parallel with the front to back axis of the tractor.

The bar 26' is attached to the ring 82 by opening the connector 44'. The connector 44' is opened by unlocking the movable arm 48' so that it can be pivoted relative to the fixed arm 46'. The fixed arm 46' is inserted through the ring 82 and the movable arm 48' is swung into engagement with the fixed arm 46' as shown in FIG. 10. The fixed arm 46' extends through the aperture 83 of the ring 82 with sufficient clearance so that the tapered bar 22' is suspended freely like a plumb. The central longitudinal axis of the bar 22' always assumes a vertical orientation regardless of the position of the tractor 12 or the bucket 16.

FOURTH MODIFICATION

Figure 13:
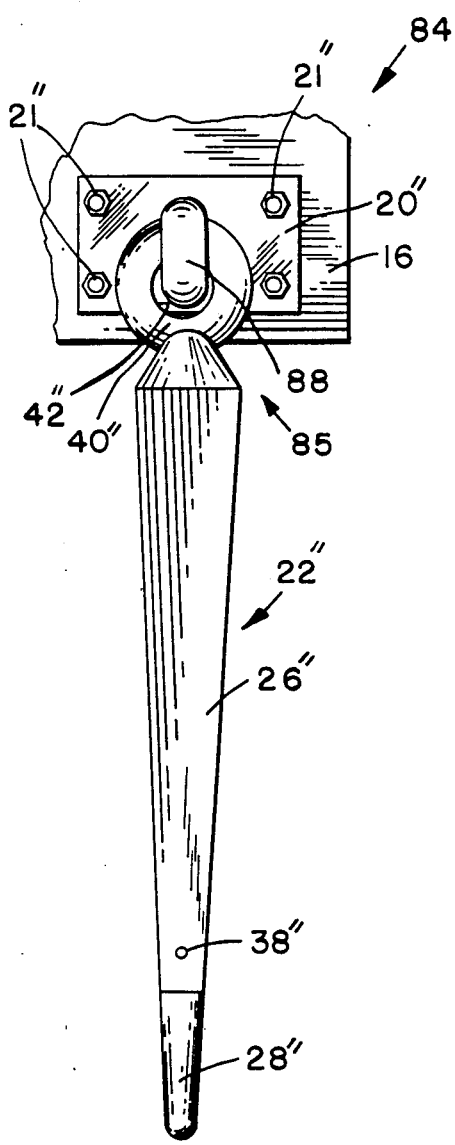
FIGS. 12 and 13 are similar to FIGS. 2 and 3 respectively, and showing a fourth modification.
Figure 12:
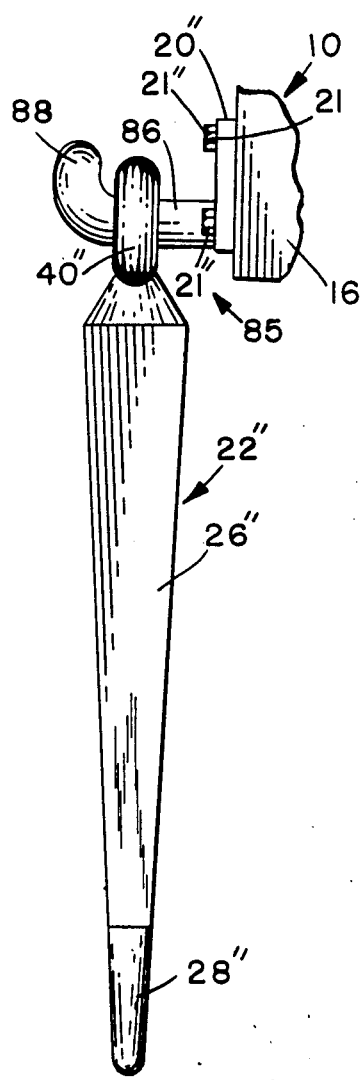

Referring to FIGS. 12 and 13, there is shown a fourth modified ground piercing attachment which is generally indicated by the reference numeral 84. The ground piercing attachment 84 comprises an elongated tapered bar 22" which is identical to the bar 22 of the preferred embodiment in every respect including a ring-shaped top 40" which has an aperture 42". The ring-shaped top 40" forms part of connecting means, generally indicated by the reference numeral 85. The connecting means 85 also includes a bracket 20" which is attached to the bucket 16 of the tractor by means of bolts 21". A horizontally extending supporting element 86 is fixed to the bracket 22" and has a hook-shaped end 88.

The bar 22" is attached to the bucket 16 by slipping the ring 40" onto the hook-shaped end 88 and moving it forwardly so that it is supported on the horizontal portion of the supporting element 86 as shown in FIG. 12. The elements 86 extends through the aperture 42" of the ring 40" with sufficient clearance so that the tapered bar 22" is suspended freely like a plumb. The central longitudinal axis of the bar always assumes a vertical orientation regardless of the position of the tractor 12 of the bucket 16.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to be secured by Letters Patent is:

1. Ground piercing attachment for a tractor having a material handling bucket which is mounted on the tractor for movement relative to the tractor, said bucket having a rear surface, said attachment comprising:
    (a) a bracket which is fixed to the lower portion of the rear surface of the bucket,
    (b) an elongated bar having a circular horizontal aperture at the top end of the bar, and
    (c) a horizontal support element fixed to said bracket and extending freely through said aperture, so that the central axis of said aperture is parallel with the front to back axis of the tractor, whereby when the bucket is raised to a sufficient height so that the bottom end of the bar is positioned above the ground, the bar is suspended so that the longitudinal axis of the bar assumes a vertical position regardless of the orientation of the tractor, and whereby subsequent lowering of the bucket causes the bar to be driven into the ground to form a posthole upon removal of the bar from the ground.

2. Ground piercing attachment as recited in claim 1, wherein the horizontal aperture at the top end of said bar is formed by an openable ring hitch comprising:
    (a) a curved hook-shaped fixed arm which is fixed to the top of said bar, and
    (b) a curved hook-shaped movable arm which is pivotally connected to said fixed arm.

3. Ground piercing attachment as recited in claim 1, wherein said bar is divided into an upper portion and a lower portion and said lower portion is made of a material which is substantially harder than said upper portion.

4. Ground piercing attachment as recited in claim 3, wherein said lower portion is removably attached to said upper portion.

5. Ground piercing attachment as recited in claim 4, wherein said upper portion has a vertical bore which extends from an opening at the bottom of said upper portion and a horizontal aperture which bisects said bore, said lower portion having an upper vertical projection which is adapted for insertion into said bore and a horizontal hole which is adapted to be aligned with said aperture upon insertion of said projection into said bore, said attachment having a retaining pin which extends through said aperture and said hole.

6. Ground piercing attachment as recited in claim 4, wherein said upper portion has a horizontal hole in its lower end, said lower portion having a vertical bore which extends from an opening at the top of said lower portion for receiving the lower end of said upper portion, and a horizontal aperture which bisects said bore and which is adapted to be aligned with said hole upon insertion of said lower end into said bore, said attachment having a retaining pin which is adapted to extend through said aperture and said hole.

7. Ground piercing attachment as recited in claim 1, wherein said bar comprises an upper portion which is square in cross section.

8. Ground piercing attachment for a tractor having a material handling bucket which is mounted on the tractor for movement relative to the tractor, said bucket having a rear surface, said attachment comprising:
    (a) a bracket which is fixed to the lower portion of the rear surface of the bucket of a tractor,
    (b) an elongated bar,
    (c) a ring which is fixed to the top end of the bar, and
    (d) a horizontal support fixed to said bracket and extending freely through said ring, so that the axis of said ring is parallel with the front to back axis of the tractor, so that said bar is suspended from said support element and pivoted about said axis, whereby when the bucket is raised to a sufficient height so that the bottom end of the bar is positioned above the ground, and whereby subsequent lowering of the bucket causes the bar to be driven into the ground to form a posthole upon removal of the bar from the ground.

9. Ground piercing attachment as recited in claim 8, wherein said ring comprises:
   (a) a curved hook-shaped fixed arm which is fixed to said bracket, and
   (b) a curved hook-shaped movable arm which is pivotally connected to said fixed arm and forming with said fixed arm an openable ring hitch.

* * * * *